United States Patent [19]
Sherman

[11] 3,971,254
[45] July 27, 1976

[54] SOLIDS LEVEL INDICATOR

[75] Inventor: Micheal I. Sherman, Glen Falls, N.Y.

[73] Assignee: Kamyr, Inc., Glens Falls, N.Y.

[22] Filed: Jan. 8, 1975

[21] Appl. No.: 539,384

[52] U.S. Cl. .............................. 73/290 R; 73/296
[51] Int. Cl.² ..................................... G01F 23/00
[58] Field of Search ............... 73/290 R, 296, 309, 73/433, 59, 434, 437; 137/4; 340/246

[56] References Cited
UNITED STATES PATENTS

| | | | |
|---|---|---|---|
| 2,398,334 | 4/1946 | Sinclair et al. | 340/246 X |
| 2,460,503 | 2/1949 | Howe | 73/309 X |
| 2,834,658 | 5/1958 | Lieffers et al. | 73/296 X |
| 2,973,639 | 3/1961 | Banks | 73/290 X |
| 3,210,495 | 10/1965 | Lau | 340/246 X |

*Primary Examiner*—Richard C. Queisser
*Assistant Examiner*—John S. Appleman
*Attorney, Agent, or Firm*—Cushman, Darby & Cushman

[57] ABSTRACT

A solids level indicator adapted for use in a vessel having solids flowing downwardly therein. A shaft is fixedly mounted at one end thereof while a generally flat plate is mounted at the free end thereof, the plate being perpendicular to the axis of the shaft. Strain gauges are mounted adjacent the fixed end of the shaft for indicating the twisting thereof in response to the weight of solids acting on the plate, the plate being in a generally horizontal plane. The fixed end of the shaft may be hollowed-out-having a thin-walled portion to which the strain gauges are affixed. Shear pins may be connected from a stationary member to the shaft to allow for rotation of the shaft relative to the stationary member should a force larger than a predetermined amount act upon the plate, whereby damage to the plate and shaft may be avoided. The shear pins and the strain gauges may be readily accessible from the exterior of the vessel allowing replacement thereof without interrupting the operation of the vessel.

20 Claims, 2 Drawing Figures

SOLIDS LEVEL INDICATOR

BACKGROUND AND SUMMARY OF THE INVENTION

This invention relates to a device for providing level indication of solid particles flowing in a vessel, bin or pipe; most particular for providing level indication of flowing wood chips in a continuous wood chip digester.

Known methods for determining the level of moving solid particles in a vessel usually involve a device that indicates positively whether the solid is or is not at the location of the indicator. The positive indication is normally provided by devices that fall in the following categories: Nuclear source and detection of rays across the vessel; sonic source with detection of the sound wave across the vessel; or magnetic field producing devices that detect the presence of solid by changes in the field. All of the devices for level detection in the above categories function adequately for solids level indication except for one common fault; they lack the ability to adequately sense solids levels in vessels filled with liquids. When the vessel is filled with a liquid the liquid itself as well as small suspended solids distort the rays, sonic waves and magnetic fields causing uncertainty in the level indication. The present invention uniquely contains the ability to indicate a solid particle level whether the solid particles are moving downward in a liquid filled vessel or a dry vessel.

According to the present invention a device is provided for indicating positively the presence of a flowing solid. The device specifically consists of a flat plate or blade located transverse to the motion or flow direction of the solid particles. One end of the plate is attached rigidly and perpendicular to a shaft. The shaft may be attached rigidly to the vessel wall by a flanging and sealing means. Strain gauges are preferably located in a hollow portion of the shaft near the flange connection, the hollow portion not being at the vessel pressure. Also the shaft material thickness is smallest at the hollow area. The motion of solid particles transverse to the plate, apply a force to the plate which results in a twist on the shaft. The twist is reflected as a physical strain at the hollowed out area in the shaft, said strain being monitored by one or multiple strain gauges adhered to the inside surface of the shaft. When so solids are flowing at the plate location the strain will be very small, thus indicating that the solid particle level is below the plate.

The level indicator of the present invention may include a flange mounting mechanism which contains pressure seals, means for removal from the vessel and shear pins to allow the plate to rotate to in line with the solid particle flow should the force on the plate become large enough to twist the shaft to breakage. The shearing of pins is most effective when solid particles become hung up above the indicator and then drop as a mass, applying a very large force on the plate. In such a case, the shear pins will shear to allow the shaft to rotate to prevent shaft breakage. The shear pins are conveniently located outside the pressure seals to allow pin replacement after the shaft and plate are rotated to the operating position.

It is a primary object of the present invention to provide an improved solids level detection device, especially for a cellulose digester. This and other objects of the invention will become clear from an inspection of the detailed description of the drawings and the appended claims.

DETAILED DESCRIPTION OF THE INVENTION

Figure 1:
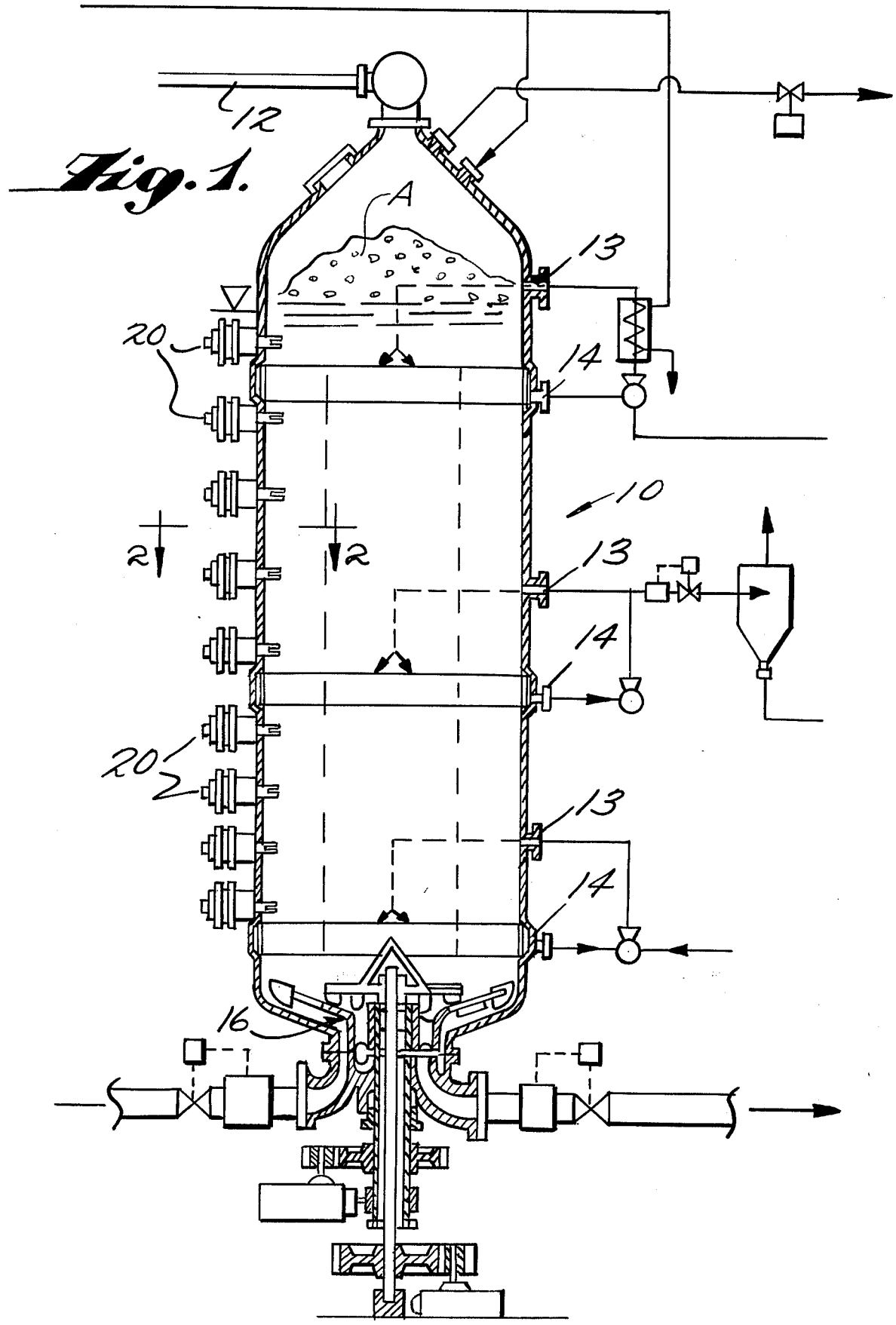
FIG. 1 is a diagrammatic cross-sectional view of a conventional cellulose digester having exemplary solids level indicating means according to the present invention associated therewith.

A conventional cellulose digester — such as shown in U.S. Pat. No. 3,579,421, the disclosure of which is hereby incorporated herein by reference — in which the solids level indicating means according to the present invention may be utilized is shown generally at 10 in the drawings. The digester 10 conventionally contains a solids inlet, 12, one or more digester liquor (i.e., sulphate liquor) inlets, 13, and one or more sieve girdle liquid outlets, 14. Wood chips A or the like — which have been pretreated by impregnation with liquor — are introduced at inlet 12, and flow downwardly primarily by the action of gravity toward the chips outlet 16 located at the bottom of vessel 10, and then are withdrawn to be acted upon further. The wood chips are usually completely immersed in liquor, although this is not essential for the proper operation of the invention, the impregnated chips being more dense than the liquor. In order to determine what the level of chips A within the digester 10 is, one or more solids level sensing means 20 are provided along the vertical extent of the digester 10. As shown in FIG. 1, the sensing means 20 are aligned one atop the other, however it should be understood that they may be arranged in a spiral around the outer periphery of the digester 10, or may be arranged in any other suitable manner relative to each other.

Figure 2:
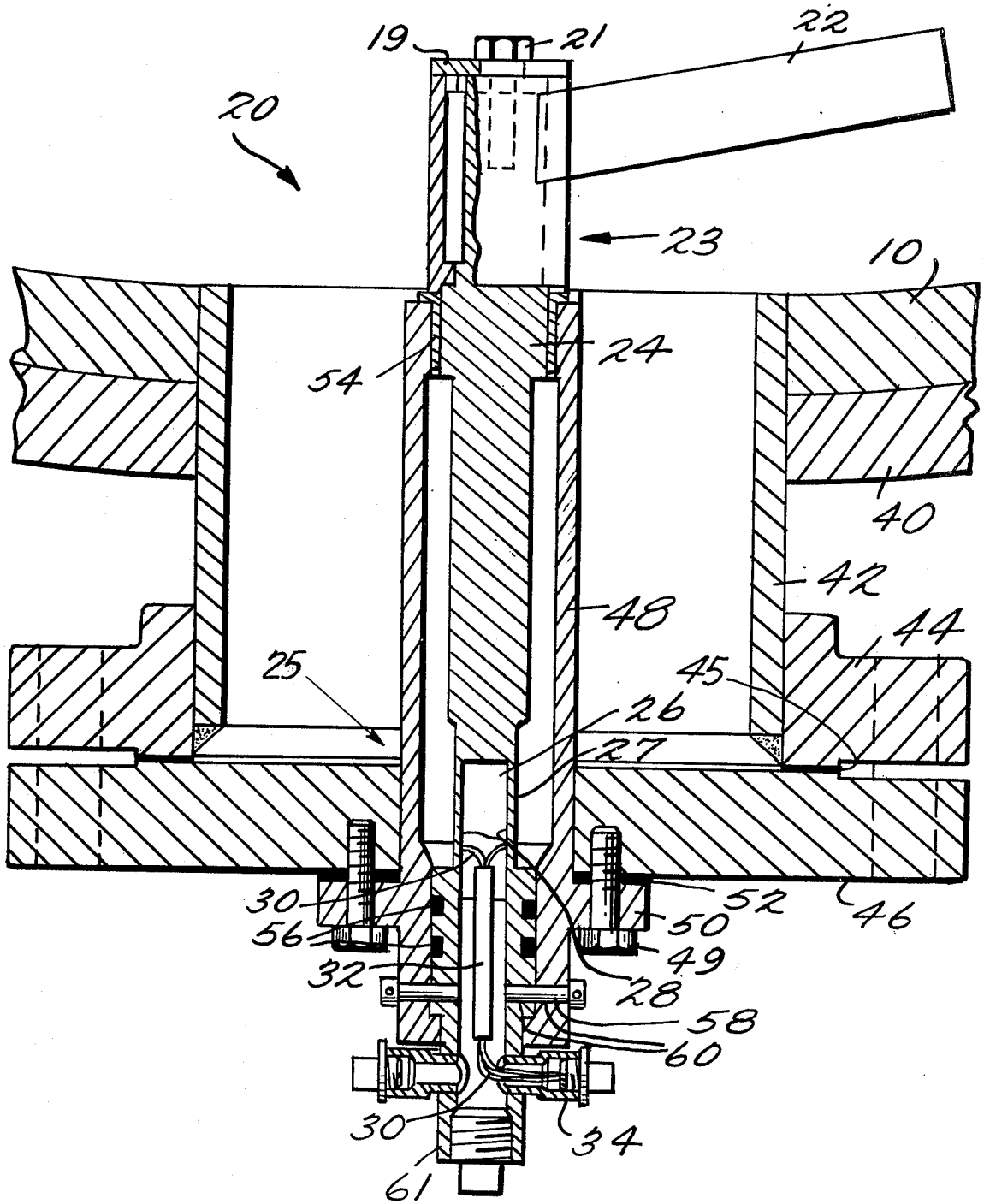
FIG. 2 is a detail view partly in section and partly in elevation taken along lines 2—2 of FIG. 1 showing exemplary improved solids level indicating means according to the present invention.

A detail view of an individual exemplary solids level indicating means 20 according to the present invention is shown in FIG. 2. The means 20 comprises a shaft 24 which is fixedly mounted at one end (25) thereof, and is connected at the free end 23 thereof to a plate or blade 22. The plate 22 is rigidly connected to shaft 24, as by a collar 19 connected by bolt 21 or the like, and is adapted to be disposed so that the plane of the plate 22 is horizontal, thereby being perpendicularly disposed with respect to the movement of chips A downwardly through the digester 10. Preferably, the end 25 of shaft 24 is hollow at 26, having thin walls 27 at that point, the walls 27 being much thinner than the rest of the shaft 24, and therefore being more responsive to twisting forces exerted thereon. Attached to the interior of the walls 27 are one or more conventional strain gauges 28 for indicating the amount of strain at walls 27 in response to twisting thereof. Wires 30 leading through a protective tube 32 or the like within hollow 26 are passed outwardly from section 26 through a suitable electrical outlet, such as plug 34, to a suitable visual or audio display, or to other apparatus to be controlled thereby (such as a valve allowing solids entrance into vessel 10).

It will be seen that if the blade 22 is disposed within a mass of wood chips A moving gradually downwardly in vessel 10, the force of the chips on the blade 22 will cause it to twist about shaft 24, causing strain gauges 28 to register the twisting thereof. The force of the liquor on the blade 22 will be minimal since there will be liquid both on top and underneath the blade 22 and since liquor is being withdrawn through girdles 14 — thus is can be said that the means 20 is responsive only to the solids level, and is not greatly affected by the liquor within the vessel 10. Of course the means 20 would work equally well without any liquor in the vessel 10.

Since the vessel 10 is under pressure, it is desirable to have particular mounting means for the indicating means 20 that facilitate mounting and replacement of parts thereof without disturbing the pressurized interior. The mounting assembly preferably includes a reinforcing plate 40 in abutting relationship with the vessel 10, a pipe 42 affixed to the vessel 10 and plate 40 and extending outwardly from the interior of the vessel 10, a mounting flange 44 rigidly attached to the end of pipe 42 opposite the end thereof connected to vessel 10, and an outer flange 46 for cooperation with the flange 44 to provide a seal between the interior and exterior of the vessel 10, a gasket 45 being interposed between the flanges 44 and 46. Extending inwardly from the outer flange 46 is a generally tubular housing 48 for surrounding the shaft 24 to provide for protection and mounting thereof. The housing 48 is rigidly secured to outer flange 46 via any suitable means, such as bolts 49 passing through flange portion 50 thereof, and a sealing gasket 52 is interposed between the flange portion 50 of housing 48 and the outer flange 46. Seals 56 — which may be in the form of O-rings — provide for sealing engagement between end 25 of shaft 24 and housing 48, while still allowing relative movement therebetween under circumstances to be described. A bushing 54 or the like may be provided at the other end of the housing 48 to prevent contact galling between the housing 48 and similar shaft 24 metals. During normal operation of the device, relative rotary movement between the shaft 24 and housing 48 is prevented by one or more pins 58 extending through bores 60 of housing 48 and shaft 24.

It will thus be seen that the mounting means provide for proper location of blade 22 within the vessel 10 while not allowing leakage of the pressurized material from the vessel 10, and that the mounting allows for easy replacement and interchange of parts. It is also to be noted that according to the illustrated embodiment of the invention, the strain gauges 28 and connections therefor are readily accessible — as through removeable plug 61 or outlet 34 — and are not in a pressurized environment so that access thereto may be gained even while the digester 10 is in use. This is very advantageous since usually it would not be economically feasible to shut down the whole digester 10 in order to merely service or replace strain gauges for the solids indicating means.

Under some circumstances when the indicating means of the present invention is in use in a digester environment, forces may be acting on the blade 22 and shaft 24 that are so large that breakage thereof might ensue. This is especially true when chips A within vessel 10 build up and adhere to the interior side walls of the vessel 10 and cause a "bridge" to form over the whole width of the vessel, below which there are relatively few chips. If this should occur, and then the bridge breaks loose, the force of the mass of chips A falling would be large enough to damage the plate 22 or shaft 24. For this reason, the pin or pins 58 for preventing relative rotation between the shaft 24 and housing 48 are preferably made to be shear pins, and their properties are engineered so that they are the weakest portion of the assembly as a whole, breaking before the plate 22 or shaft 24 reach their respective breaking points. Since the pins 58 are mounted exteriorly of the vessel 10 and the housing 48, replacement thereof is quick and simple, and may be effected while the digester 10 is in operation.

A preferred embodiment of the invention having been described, its operation will now be set forth. A plurality of means 20 are inserted at various heights within the vessel 10, the planes of the plates 22 extending generally horizontally. Sealing of the plate 22 and shaft 24 within the pressurized vessel 10 from the exterior of the vessel is preferably accomplished with pipe 42, flanges 44 and 46 with gasket 45 interposed therebetween, and housing 48 connected to flange 46 and sealed with gasket 52, and surrounding shaft 24 and sealed therefrom via O-rings 56 or the like. When solids in vessel 10 are above the location of a blade 22, the force they exert thereon under the influence of gravity and the continuous removal of other chips in the stack through chips outlet 16, results in twisting of the shaft 24, and this twisting is recorded by strain gauges 28 or the like disposed within the hollowed out portion 26 of the shaft 24 at the thinnest portion 27 thereof. If the chips level is below the blade 22, then no large force is exerted thereon — the force of the liquor of freely falling chips being insignificant — and there will be no twisting of shaft 24 or indication thereof by gauges 28.

Should the chips within the vessel 10 bridge over the width thereof, and should the bridge later collapse, as the mass of chips falls downwardly it will strike the plate 22 with large enough force to shear pins 58, allowing the plate 22 to rotate from its normal horizontal position to a downwardly facing vertical position, and therefore damage to the blade 22 or shaft 24 will be avoided. Replacement of shear pins 58 — and the strain gauges 28 — is facilitated since they are located outside the pressurized environment of the vessel 10.

It will thus be seen that an improved solids level indicating means has been herein shown and described whose operation is not impaired by liquid within the vessel which solids level it is monitoring, that positively indicates when the solids level is thereabove, that will not be damaged by excessively large forces that may be intermittently applied thereto within the vessel, and that can be readily serviced without interrupting the functioning of the vessel being monitored.

While the invention has been herein shown and described in what is presently conceived to be the most practical and preferred embodiment, it will be apparent to one of ordinary skill in the art that many modifications may be made thereof within the scope of the invention. For instance, the solids level indicating means may be used in other environments — both liquid and dry — other than a cellulose digester, and other mounting means and differently shaped members could be employed. Other modifications are also possible, thus it is intended that the invention not be restricted to the embodiment illustrated, but be accorded the broadest interpretation of the appended claims in order to encompass all equivalent structures and devices.

What is claimed is:

1. A detector for indicating the solids level in a vessel or the like adapted to have solid particles flowing downwardly therein, the vessel or the like having a generally vertical axis, said detector comprising a. a shaft having an axis passing through the center thereof,
b. means for fixedly mounting said shaft at a first end thereof to the vessel or the like and for allowing a second end thereof to be freely mounted, said second end extending into the vessel or the like,
c. a generally flat plate,
d. means for rigidly mounting one end of said plate to said second end of said shaft, said plate being perpendicular to said shaft axis, and generally perpendicular to the axis of the vessel or the like,
e. a thin-walled portion of said shaft located adjacent said first end thereof, said shaft being generally tubular at said thin-walled portion thereof, and
f. means for indicating twisting motion of said shaft as a result of solid particles acting on said plate, said means including a strain gauge mounted on said thin-walled portion of said shaft interiorly thereof.

2. A detector as recited in claim 1 further comprising a housing surrounding a portion of said shaft adjacent said first end thereof, and means for mounting said shaft for rotation with respect to said housing should a force larger than a predetermined amount act on said plate.

3. A detector as recited in claim 2 further comprising a bushing mounted between said housing and said shaft at an end of said housing adjacent said shaft free end.

4. A detector as recited in claim 1 wherein said means for fixedly mounting said shaft at a first end thereof includes means for allowing relative rotary movement between a stationary member and said shaft from a position wherein the plane of said plate is horizontal to a position wherein the plane of said plate is vertical in response to a force larger than a predetermined amount acting on said plate, said means including a shear pin extending from said stationary member into an aperture formed in said shaft.

5. A solids level detecting assembly comprising
a. a vessel or the like adapted to have solid particles flowing downwardly therein, and having a generally vertical axis,
b. means responsive to the level of solid particles in said vessel but not responsive to a liquid medium therefor, said means including (i) a shaft having an axis passing through the center thereof, (ii) means for fixedly mounting said shaft at a first end thereof to the vessel or the like and for allowing a second end thereof to be freely mounted, said second end extending into the vessel or the like, (iii) a generally flat plate (iv) means for rigidly mounting one end of said plate to said second end of said shaft, said plate being perpendicular to said shaft axis and generally perpendicular to the vessel axis, and (v) means mounted adjacent said first end of said shaft responsive to the twisting of said shaft and torsional strain thereof as a result of solid particles acting on said plate and for indicating said twisting thereof, and
c. means for mounting said level responsive means in said vessel so that the plane of said plate is generally horizontal.

6. An assembly as recited in claim 5 wherein said shaft includes a thin-walled portion at said first end thereof, said shaft having an open interior at said thin-walled portion thereof, and wherein said means responsive to twisting of said shaft is mounted on said thin-walled portion interiorly of said shaft.

7. An assembly as recited in claim 6 wherein said means for fixedly mounting said first end of said shaft includes means for allowing relative rotary movement between a vessel wall and said shaft from the position wherein said plane of said plate is horizontal to a position wherein the plane of said plate is vertical in response to a force larger than a predetermined amount acting on said plate, said means including a shear pin extending from a stationary member operatively connected to said vessel wall into an aperture formed in said shaft.

8. An assembly as recited in claim 6 wherein said means for fixedly mounting said first end of said shaft includes a housing member surrounding a portion of said shaft interiorly of said vessel and extending exteriorly of said vessel, and means for allowing relative rotary movement between said housing and said shaft from the position wherein said plane of said plate is horizontal to a position wherein the plane of said plate is vertical in response to a force larger than a predetermined amount acting on said plate, said means including a shear pin located exteriorly of said vessel and extending through apertures formed in said housing and said shaft.

9. An assembly as recited in claim 6 wherein said means responsive to the twisting of said shaft includes a strain gauge, and said assembly further comprising means for allowing access to the interior of said shaft thin-walled portion from the exterior of said vessel whereby said strain gauge may be inspected, repaired, or replaced without interfering with operation of said vessel.

10. An assembly as recited in claim 5 wherein said means for mounting said level responsive means in said vessel so that the plane of said plate is generally horizontal includes a pipe section operatively attached to a vessel wall and extending outwardly therefrom, a first flange member operatively connected to the outwardmost end of said pipe, and an outer flange member operatively rigidly connected to said shaft and sealingly connected to said first flange member.

11. An assembly as recited in claim 5 wherein said vessel contains solids and liquid, and is pressurized.

12. An assembly as recited in claim 11 wherein said means for fixedly mounting said first end of said shaft includes a housing member surrounding a portion of said shaft interiorly of said vessel and extending exteriorly of said vessel, and means for allowing relative rotary movement between said housing and said shaft from the position wherein said plane of said plate is horizontal to a position wherein the plane of said plate is vertical in response to a force larger than a predetermined amount acting on said plate, said means including a shear pin located exteriorly of said vessel and extending through apertures formed in said housing and said shaft, and means for sealing said shaft and said housing to prevent egress of fluid from the interior of said vessel.

13. An assembly as recited in claim 11 wherein said shaft includes a thin-walled portion at said first end thereof, said shaft having an open interior at said thin-walled portion thereof, and wherein said means responsive to twisting of said shaft is mounted on said thin-walled portion interiorly of said shaft.

14. An assembly as recited in claim 13 wherein said means responsive to the twisting of said shaft includes a strain gauge, and wherein said open interior portion of said shaft extends exteriorly of said vessel whereby said strain gauge may be inspected, repaired, or replaced without interfering with operation of said vessel, and further comprising means for sealing the portion of said shaft extending exteriorly of said vessel to prevent egress of fluid from said vessel.

15. An assembly as recited in claim 11 wherein said means for fixedly mounting said first end of said shaft includes means for allowing relative rotary movement between a vessel wall and said shaft from the position wherein said plane of said plate is horizontal to a position wherein the plane of said plate is vertical in response to a force larger than a predetermined amount acting on said plate, said means including a shear pin extending from a stationary member operatively connected to said vessel wall into an aperture formed in said shaft.

16. An assembly as recited in claim 11 wherein said means for mounting said level responsive means in said vessel so that the plane of said plate is generally horizontal includes a pipe section operatively attached to a vessel wall and extending outwardly therefrom, a first flange member operatively connected to the outwardmost end of said pipe, and an outer flange member operatively rigidly connected to said shaft and sealingly connected to said first flange member.

17. An assembly as recited in claim 5 further comprising a plurality of means responsive to the level of solid particles in said vessel mounted at various different vertical locations of said vessel.

18. An assembly as recited in claim 5 wherein said means for fixedly mounting said first end of said shaft includes means for allowing relative rotary movement between a vessel wall and said shaft from the position wherein said plane of said plate is horizontal to a position wherein the plane of said plate is vertical in response to a force larger than a predetermined amount acting on said plate, said means including a shear pin extending from a stationary member operatively connected to said vessel wall into an aperture formed in said shaft.

19. An assembly as recited in claim 5 wherein said means for fixedly mounting said first end of said shaft includes a housing member surrounding a portion of said shaft interiorly of said vessel and extending exteriorly of said vessel, and means for allowing relative rotary movement between said housing and said shaft from the position wherein said plane of said plate is horizontal to a position wherein the plane of said plate is vertical in response to a force larger than a predetermined amount acting on said plate, said means including a shear pin located exteriorly of said vessel and extending through apertures formed in said housing and said shaft.

20. A detector as recited in claim 19 further comprising a bushing mounted between said housing and said shaft at an end of said housing adjacent said shaft free end.

* * * * *